(12) United States Patent
Yang et al.

(10) Patent No.: US 9,277,210 B2
(45) Date of Patent: Mar. 1, 2016

(54) METHOD AND APPARATUS FOR PARTIAL COEFFICIENT DECODING AND SPATIAL SCALING

(75) Inventors: Jiheng Yang, Beijing (CN); Li Hua Zhu, Burbank, CA (US); Hui Zhang, Beijing (CN)

(73) Assignee: Thomson Licensing (FR)

( * ) Notice: Subject to any disclaimer, the term of this patent is extended or adjusted under 35 U.S.C. 154(b) by 1070 days.

(21) Appl. No.: 12/998,899

(22) PCT Filed: Dec. 8, 2009

(86) PCT No.: PCT/EP2009/066589
§ 371 (c)(1),
(2), (4) Date: Jun. 14, 2011

(87) PCT Pub. No.: WO2010/069815
PCT Pub. Date: Jun. 24, 2010

(65) Prior Publication Data
US 2011/0249746 A1    Oct. 13, 2011

(30) Foreign Application Priority Data
Dec. 19, 2008   (EP) ..................................... 08305983

(51) Int. Cl.
*H04N 7/12*        (2006.01)
*H04N 19/00*       (2014.01)
(Continued)

(52) U.S. Cl.
CPC ............. *H04N 19/00* (2013.01); *H04N 7/0102* (2013.01); *H04N 7/0125* (2013.01); *H04N 19/48* (2014.11);
(Continued)

(58) Field of Classification Search
CPC ........................... H04N 19/48; H04N 21/0102
USPC .................................................... 375/240.16
See application file for complete search history.

(56) References Cited

U.S. PATENT DOCUMENTS 5,825,927 A    10/1998   Boyce et al.
6,804,294 B1   10/2004   Hartung
(Continued)

FOREIGN PATENT DOCUMENTS

EP    1257127    11/2002
EP    1553779    1/2004
(Continued)

OTHER PUBLICATIONS

Seo et al., Fast Motion Vector Re-estimation for Transcoding MPEG-1 into MPEG-4 with Lower Spatial Resolution in DCT-Domain, Signal Processing: vol. 19, No. 4, Apr. 1, 2004, Image Communications, pp. 299-312.
(Continued)

*Primary Examiner* — Richard Torrente
(74) *Attorney, Agent, or Firm* — Jack Schwartz & Associates, PLLC

(57) ABSTRACT

Video equipment, e.g. for TV producers studios, need to display multiple channels of bit-streams simultaneously. Decoding multiple streams of high bit-rate videos is extremely computational intensive. An improved method for browsing an encoded frequency domain video sequence comprises steps of determining a spatial and/or temporal reduction level for browsing a video sequence, determining according to the determined reduction level frames, fields or parts of blocks or macroblocks to be skipped for decoding, and decoding the remaining data to a video with lower spatial and/or temporal resolution. The reduction may include adaptive partial coefficient decoding, motion vector truncation and/or simplified deblocking filtering. The reduction of spatial resolution is advantageously performed in the frequency domain, so that the inverse quantization process and the iDCT processes require less computing.

14 Claims, 8 Drawing Sheets

(51) Int. Cl.
*H04N 7/01* (2006.01)
*H04N 21/2343* (2011.01)
*H04N 21/4363* (2011.01)
*H04N 19/48* (2014.01)
*H04N 7/015* (2006.01)

(52) U.S. Cl.
CPC ............ *H04N 21/234363* (2013.01); *H04N 21/234381* (2013.01); *H04N 21/43637* (2013.01); *H04N 7/0152* (2013.01); *H04N 7/0157* (2013.01)

(56) References Cited

U.S. PATENT DOCUMENTS

| | | | |
|---|---|---|---|
| 6,871,006 | B1 | 3/2005 | Oguz et al. |
| 7,180,948 | B2 | 2/2007 | Yamada et al. |
| 8,432,971 | B2 | 4/2013 | Metsugi et al. |
| 2002/0097797 | A1 | 7/2002 | Sugiyama et al. |
| 2002/0154700 | A1 | 10/2002 | Tardif |
| 2004/0126021 | A1 | 7/2004 | Chun et al. |
| 2004/0218678 | A1 | 11/2004 | Tardif |
| 2006/0146941 | A1 | 7/2006 | Cha et al. |
| 2006/0182176 | A1* | 8/2006 | Boyce et al. ............ 375/240.12 |
| 2006/0245491 | A1 | 11/2006 | Jam et al. |
| 2008/0307128 | A1* | 12/2008 | Amron et al. .................. 710/65 |

FOREIGN PATENT DOCUMENTS

| | | |
|---|---|---|
| JP | 11146398 | 5/1999 |
| JP | 2002218472 | 8/2002 |
| JP | 2002305746 | 10/2002 |
| JP | 2006203280 | 8/2006 |
| JP | 2008177757 | 7/2008 |
| JP | 2009272718 | 11/2009 |
| WO | WO2008051517 | 5/2008 |
| WO | WO2008148207 | 12/2008 |
| WO | WO2008150768 | 12/2008 |

OTHER PUBLICATIONS

Search report dated Apr. 20, 2010.
Song et al. "Fast extraction of spatially reduced image sequences from MPEG-2 compressed video", IEEE Trans. On Circuit and System for Video Technology, vol. 9, No. 7, Oct. 1999, pp. 1100-1114.
Yeo et al., "On the Extraction of DC Sequence for MPEG Compressed video", Processing of International Conference of Image Processing 1995, vol. II, pp. 260-263.
Agarwal et al., "A fast algorithm to find the region-of-interest in the compressed MPEG domain", Proceedings 2003 International Conference on Multimedia and Expo, vol. 2. IEEE, Piscataway, NJ, USA, 2003, pp. 133-136.
Barrau E., "MPEG video transcoding to a fine-granular scalable format", Proceedings 2002 International Conference on Image Processing, vol. 1. IEEE, Piscataway, NJ, USA, 2002, pp. 717-720.
Chan et al., "HDTV down-conversion using a drift reduction scheme", Proceedings of the SPIE—The International Society for Optical Engineering, vol. 4067, pt.1-3, 2000, pp. 551-555.
Jiang et al., "Empirical study of partial decoding for fast browsing of MPEG-2 compressed videos", Proceedings of the SPIE—The International Society for Optical Engineering, vol. 4666, 2002, pp. 1-9.
Lei et al., "News video summarization based on spatial and motion feature analysis", vances in Multimedia Information Processing—PCM 2004. 5th Pacific Rim Conference on Multimedia. Proceedings, Part II (Lecture Notes in Computer Science vol. 3332), Springer-Verlag, Berlin, Germany, 2004, pp. 246-255.
Shimizu A. "MPEG interlaced video transcoding for a networked video browsing system", Proceedings of the SPIE—The International Society for Optical Engineering, vol. 5308, No. 1, 2004, pp. 1244-1252.
Tsai Ez Al., "Low complexity motion refinement for DCT-domain video transcoder", 2006 International Conference on Communications, Circuits and Systems, IEEE, Piscataway, NJ, USA, 2006, CD-ROM pp. 524-527.

* cited by examiner a)

b)

METHOD AND APPARATUS FOR PARTIAL COEFFICIENT DECODING AND SPATIAL SCALING

This application claims the benefit, under 35 U.S.C. §365 of International Application PCT/EP2009/066589, filed Dec. 8, 2009, which was published in accordance with PCT Article 21(2) on Jun. 24, 2010 in English and which claims the benefit of European patent application No. 08305983.2, filed Dec. 19, 2008.

FIELD OF THE INVENTION

This invention relates to a method for browsing video streams, and particularly high bit-rate video streams.

BACKGROUND

With the rapid development of capture equipments, storage technologies and the growing needs for better visual experience from the viewer, high bit-rate video has already been applied widely for content distribution, movie production and video broadcasting. Moreover, in the next coming years, high bit-rate videos will be available not only for professional content providers, but also for consumers.

Video equipment such as non-linear editing systems, e.g. for TV production studios, may need to display multiple channels of bit-streams in real-time simultaneously. Decoding multiple streams of high bit-rate videos is extremely computational intensive. Prior art[1] to solve this issue with software need an auxiliary file to store less frequency coefficients and a partial additional stream, and yields just a blurry version of the video. However, to store such auxiliary file for each bit-stream takes much time and storage space. It is a preprocessing technique that requires off-line computation, therefore it is impossible to browse an MPEG-1/2 bit-stream in real-time. Moreover, using a fixed scheme of only DC values or only DC+2AC values is inflexible and cannot make full use of the available resources. Decoding of one or multiple high bit-rate video streams with hardware is very expensive because multiple sets of hardware are required for decoding multiple video channels.

[1] J. Song and Boon-Lock Yeo, "Fast Extraction of Spatially Reduced Image Sequences from MPEG-2 Compressed Video", IEEE Transaction on Circuit and System For Video Technology, Vol. 9, No. 7, October 1999, pp 1100-1114

The normal frame-rate for video in television is usually 24 or 30 frames per second (fps). But nowadays, since the growing requirement of customers, higher frame-rate videos are becoming popular in video content production and even TV broadcasting. Higher frame-rates can e.g. avoid motion blur caused by the display mechanism of LCD displays; therefore more pleasing visual effects can be offered. Also in professional video applications, such as TV program production and movie content distribution, high frame-rate is often chosen to ensure the viewer gets the best visual experience.

However, the higher the frame rate is, the more complex the decoding process will be. Therefore real-time decoding of one or multiple channels with high frame-rate video is a challenge. Existing solutions for the frame-rate pull down process employ a brute force method: a target output frame-rate is provided, and then each $x^{th}$ frame is dropped, in an equidistant manner, to control the resulting frame-rate. Therefore, the subjective quality of the decoded video can become very low. Especially when the input frame-rate varies a lot from the output frame-rate, there will be a lot of motion jerkiness and annoying artifacts. It is therefore desirable to find a solution for fast real-time video browsing with improved visual quality, e.g. by an improved frame-rate pull down method.

SUMMARY OF THE INVENTION

The present invention provides an improved method for browsing video streams, and in particular high data rate video streams. Examples are high-resolution/high-definition (HD) video streams, high color bit-depth video streams and high frame rate video streams. In particular, the target of the inaccurate decoding process is simultaneous browsing the content of one or more video streams, or transcoding the result videos for archive.

E.g. for fast browsing of high-definition (HD) video, one aspect of the invention is to directly decode a higher resolution video to a smaller resolution video. This refers to spatial and/or temporal resolution. A decoder that receives e.g. HD video as input may directly decode the video into standard definition (SD), instead of decoding it into HD and then down-sample it. Therefore the decoder can run much faster.

E.g. for fast browsing of high frame-rate video, one aspect of the invention is to mark and skip some skippable frames before decoding, so that the decoder has less pictures to decode. Therefore faster decoding is possible.

E.g. for fast browsing of high bit-rate video, one aspect of the invention is to change the decoding mechanism of the decoder, so that the decoder has less computational burden for videos at high bit-rate, e.g. 100 Mbps or more.

E.g. for fast browsing for interlaced video, one aspect of the invention is to combine the above-mentioned techniques. Since for interlaced video it is sufficient to browse single fields, the decoding behaviour is very different compared to progressive sources.

These aspects refer to the same problem, but they are in principle independent from each other. They can be either performed independently or they can be combined to achieve fast video browsing. The more techniques are combined, the faster the decoder will be. It is possible to select how much faster the decoding should be, by selecting one of the possible combinations of the techniques to achieve the required kind of result.

In one aspect, the invention uses in principle the steps of determining a spatial and/or temporal reduction level for browsing a video sequence, determining according to the determined reduction level frames, fields or parts of blocks or macroblocks to be skipped for decoding, and decoding the remaining data to a video with lower spatial and/or temporal resolution. The decoded data are provided for a display or storage for later being displayed.

The reduction of spatial resolution is advantageously performed in the frequency domain, so that the inverse quantization process and the inverse DCT (iDCT) processes require less computing, and are therefore easier. This spatial down-scaling is preferably performed before the actual decoding, i.e. in the frequency domain.

In one embodiment, the reduction of horizontal spatial resolution is different from the reduction of vertical spatial resolution. This is achieved by using different numbers of columns and rows in the kernel matrix. It is an advantage of such reduced spatial resolution according to the invention that the visual quality is improved, and that less aliasing errors occur than with conventional methods.

The reduction of temporal resolution can be achieved by smart frame skipping, i.e. adaptively determining which frames or fields can be skipped. A controller performs a GOP analysis and decides, based on the GOP analysis, for each frame whether it can be skipped. Motion vectors can be rescaled accordingly, with the same factors in horizontal and vertical dimension respectively, and are then truncated to integer.

It is an advantage of the reduced temporal resolution according to the invention that a desired frame rate can be achieved exactly. Further, by using the combined spatial and temporal resolution reduction a desired data rate can be obtained more exactly than with conventional browsing methods.

One aspect is to choose the best set of coefficients to achieve better visual quality. One aspect is an adaptive frame drop algorithm, which comprises determining and marking skippable frames, and skipping the marked frames before decoding, depending on a target frame rate. Therefore usually not all skippable frames are skipped, and the target frame rate can be matched exactly.

One aspect is to use frequency-domain downscaling instead of time-domain downscaling. This is achieved by using a downscaled kernel matrix. E.g. for a target application of scaling, particularly with different scales in horizontal and vertical dimensions, the downscaling of the kernel matrix may be asymmetric.

One advantage of the invention is that it enables fast browsing of high bit-rate video sequences in portable devices that have limited processing capacity, memory or display size. E.g. a decoder gets high-definition (HD) video data and decodes them directly into standard definition (SD), instead of downsampling the decoded HD as usual. As another advantage, a given target frame rate and a given target data rate or processing rate can be achieved exactly. A further advantage is that the phase distortion in the reduced reconstructed picture is reduced.

According to one aspect of the invention, a method for browsing a video sequence comprising frames that are block-wise encoded, each block comprising an M*M frequency domain coefficient matrix, wherein the coefficients represent vertical and horizontal frequency components, the method comprises steps of determining for each frequency coefficient a matrix (kernel sub-matrix, see below) representing the contribution of the frequency coefficient to the time domain pixels of the current block, setting in the matrix the coefficients of at least one column or one row to zero, wherein neighbor columns on both sides of said column or neighbor rows above and below said row are not set to zero (thus, the contribution to a non-edge row or column is cancelled), performing inverse quantization and inverse transform using the coefficients of said matrix, wherein time domain pixel blocks with less than M*M pixels are obtained, and generating a video frame from the pixel blocks.

According to another aspect of the invention, a method for browsing a video sequence, wherein temporally adjacent frames within said sequence form a GOP (group-of-pictures), and wherein frames within the GOP are predicted based on other frames within the GOP, comprises steps of determining a target frame rate, determining in the GOP one or more reference frames and one or more non-reference frames, determining a first, current frame rate based on the reference frames, comparing the first, current frame rate with the target frame rate, and if the determined first frame rate matches the target frame rate, decoding only the reference frames, or otherwise if the determined first frame rate is lower than the target frame rate, decoding the reference frames and at least one of the non-reference frames, or otherwise if the determined first frame rate is higher than the target frame rate, determining among the one or more reference frames at least one first reference frame that is referenced only by frames that are not reference frames, and decoding only reference frames other than said first reference frame.

Both methods may be combined. Further objects, features and advantages of the invention will become apparent from the following description and the appended claims when taken in connection with the accompanying drawings.

BRIEF DESCRIPTION OF THE DRAWINGS

Exemplary embodiments of the invention are described with reference to the accompanying drawings, which show in FIG. 1 a general video decoding framework.

DETAILED DESCRIPTION OF THE INVENTION

Figure 1:
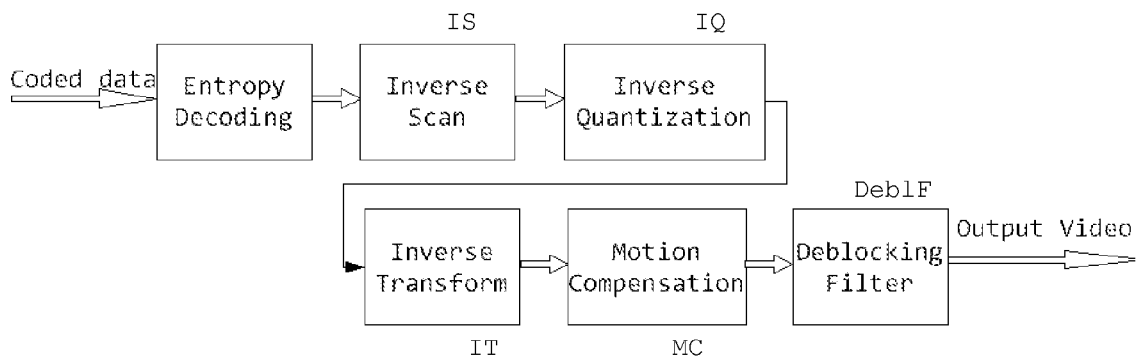

A general framework of video decoding is shown in FIG. 1. Encoded video data are entropy decoded and inversely scanned, wherein frequency domain coefficients of blocks or macroblocks (MB) are obtained. The coefficients are inverse quantized and inverse transformed. The resulting residual picture is input to motion compensation (MC), and the resulting picture is filtered in a deblocking filter, in order to remove blocking artefacts.

The present invention improves several of the blocks that are depicted in FIG. 1. It utilizes the fact that in the scenario of video browsing it is good enough to show just an approximated version of the original video. However, at least for some applications it is desirable that even an approximated version of a video provides a quality as high as possible.

Figure 2:
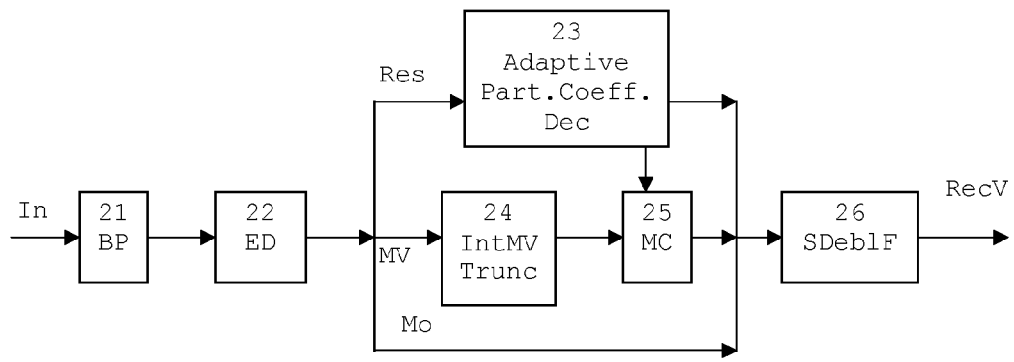
FIG. 2 a fast high bit-rate video browsing system.

FIG. 2 shows a simplified fast high bit-rate video browsing system according to one embodiment of the invention. The received input bit stream In is parsed in a bit-stream parsing block 21, and then decoded in an entropy decoding block 22. The entropy decoding results in residual data Res (or intra coded data, not shown), motion vectors MV and control information Mo, such as mode information. The residual data Res are decoded by adaptive partial coefficient decoding 23, which reduces the number of coefficients as described below. The motion vectors are truncated to integer values in an Integer MV Truncation module 24, and then together with the decoded residuals input to a motion compensation block 25. Due to the integer MVs and the reduced amount of coefficients, the MC is simplified. The resulting picture may be filtered by a deblocking filter 26, which may also be simplified in order to reduce the amount of processing. Most video coding standards apply a deblocking filter or loop filter to remove block artefacts. Most of these filters are very computational expensive. Since we are decoding the video frames in an approximated form, the deblocking filter can be substituted by a simpler filter to reduce the complexity of processing.

Figure 3:
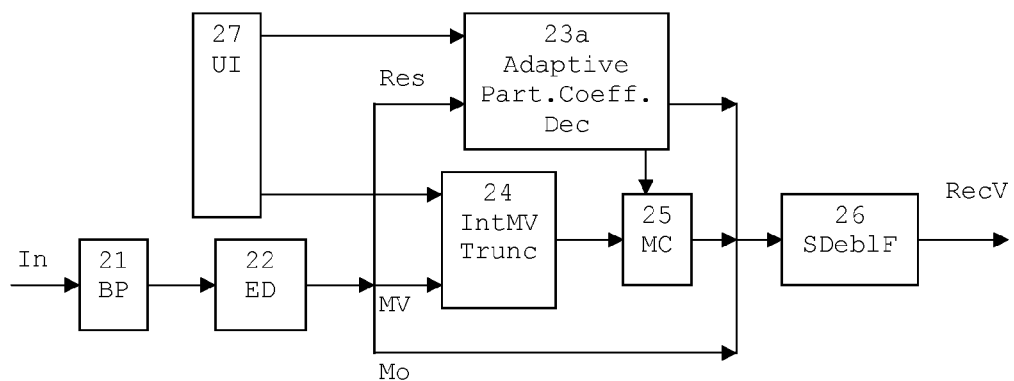
FIG. 3 a fast high-definition video browsing system.

FIG. 3 shows an embodiment where a user interface 27 is provided for inputting user customized decoded block size, in terms of width w and height h. If we choose to output every block to the size of w*h, then the original motion vectors parsed from the bit-stream are not valid any more since the horizontal and vertical resolution of the video are not the same as the original. So the motion vectors are to be scaled accordingly. More details are given below.

Figure 4:
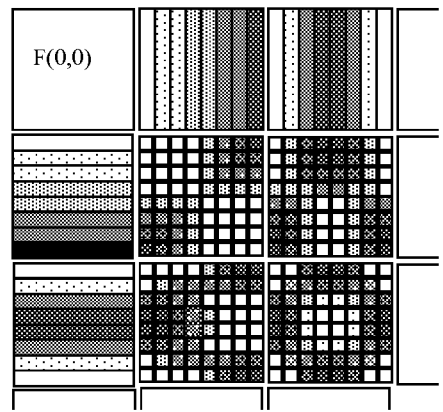
FIG. 4 a portion of a frequency coefficient matrix F(u,v)

In the following, the aspect of reducing the amount of coefficients is described in more detail. Encoded video commonly contains frequency domain coefficients that are the result of a transform, such as a DCT (Discrete Cosine Transform). In the frequency domain, each MB is represented as a weighted sum of patterns, where every pattern has different significance on reconstructing the video frame. A portion of such pattern is shown in FIG. 4. The weighting coefficients used for each pattern represent the actual video signal. These weighting coefficients are quantized, and only coefficients that were not quantized to zero are transmitted. For an exact decoding, the inverse steps are performed. For simplified decoding according to this aspect of the invention, the decoding of some of the coefficients is skipped. This is achieved by setting certain coefficients to zero.

The coefficients are commonly depicted as a quadratic matrix, where each coefficient has two indices, one for its horizontal position and one for its vertical position. Each coefficient represents a particular luminance frequency portion that is contained in the respective MB: horizontal coefficients, such as e.g. $C_{0,2}$, represent a pure horizontal luminance portion, vertical coefficients, such as e.g. $C_{2,0}$, represent a pure vertical luminance portion, and mixed coefficients, such as e.g. $C_{3,3}$, represent mixed portions of both horizontal and vertical luminance. In principle the same system is applied for chrominance. The DC coefficient having the indices (0,0) is the most significant one among all the coefficients. For other coefficients, the closer distance they are to the DC coefficient within the matrix, the more significant it is.

The input of the decoder's inverse transform is a matrix of weighting coefficients from the bit-stream. By multiplying this matrix to another matrix representing the respective luminance pattern, the so-called kernel matrix, the residual of the video frame can be obtained. This multiplication can be performed simultaneously in multiple kernels on a parallel processing architecture, such as a GPU (Graphics Processing Unit). For each inverse transform algorithm, the contribution of each coefficient to the decoded frame is decided by the kernel matrix. Taking MPEG-2 as an example to illustrate the concept, an inverse DCT is used as inverse transform algorithm. The standard inverse transform formula is:

$$f(x, y) = \frac{2}{N} \sum_{u=0}^{N-1} \sum_{v=0}^{N-1} C(u) * C(v) * F(u, v) * \cos\left(\frac{((2x+1)u\pi)}{2N}\right) * \cos\left(\frac{((2y+1)v\pi)}{2N}\right) \quad (1)$$

f(x, y) stands for a decoded pixel gray value for position (x, y); N stands for the block size which is 8 in MPEG2; C(u) and C(v) equal to $1/\sqrt{2}$ if u=0 and v=0; C(u) and C(v) equals to 1 otherwise. F(u,v) stands for the frequency domain coefficient at position (u,v).

Then for each coefficient F(u,v) the contribution to the reconstructed video frame at location (x,y) is:

$$F(u, v, x, y) = \frac{2}{N} * C(u) * C(V) * \cos\left(\frac{((2x+1)u\pi)}{2N}\right) * \cos\left(\frac{((2y+1)v\pi)}{2N}\right) \quad (2)$$

For an 8*8 reconstructed block (x=0, ..., 7 and y=0, ..., 7), the contribution matrix of F(u,v) can be written as $$kernelmat_{(u,v)} = \begin{bmatrix} F(u, v, 0, 0) & F(u, v, 0, 1) & \ldots & F(u, v, 0, 7) \\ F(u, v, 1, 0) & F(u, v, 1, 1) & \ldots & F(u, v, 1, 7) \\ \ldots & \ldots & \ldots & \ldots \\ F(u, v, 7, 0) & F(u, v, 7, 1) & \ldots & F(u, v, 7, 7) \end{bmatrix} \quad (3)$$

Then the reconstruction process can be noted as:

$$decodedblock = F(0, 0) * kernelmat_{(0,0)} + F(0, 1) * kernelmat_{(0,1)} + \ldots + F(7, 7) * kernelmat_{(7,7)} \quad (4)$$

Kernel Matrix Reduction

As describe above, different coefficients have different significance contributing to the quality of the decoded video. For browsing a video, only a reduced amount of coefficients needs to be considered. Conventionally, only 4 or 5 coefficients instead of 64 coefficients in MPEG-1/2 or 16 coefficients in MPEG-4 AVC can provide a quality good enough for viewing. The present invention adaptively chooses few coefficients in a coded block, depending on a given target data rate. Thus, most of the coefficients will not be processed with inverse quantization. Furthermore, a kernel matrix based inverse transform scheme can be used instead of conventional methods, in order to avoid unnecessary computational cost by the inverse transform.

On browsing high data rate video, only approximation to the accurate pixel value is required. Therefore, we adaptively select e.g. the first n non-zero coefficients or the first n coefficients in raster scan order to multiply with their corresponding kernel matrices and to get an approximated version of the reconstructed block. Since we only consider n coefficients, and other coefficients are abandoned, the inverse quantization is performed only to n coefficients instead of all coefficients. Significant computation costs can thus be saved. By the adaptive selection of n coefficients for iDCT, n can be a parameter for tuning during decoding, to ensure that the decoded video can satisfy the subjective current quality requirements.

According to one aspect of the invention, one or more rows or columns of the kernel matrix can be removed (though possible, the row and column containing the DC coefficient are preferably not removed), thereby forming a smaller kernel matrix. Thus the decoded block is smaller in size. We can control, as an input parameter to the decoder, how large the reconstructed decoded block should be. E.g. if the second column is set to zero, $kernelmat_{(0,1)}$ in eq. (4) is zero.

In particular, the removed rows or columns need not be contiguous, and need not represent the highest frequency components. In other words, if e.g. the coefficients of a column are set to zero, and the column is thereby removed, there may be one or more other columns on both sides that are not removed. If the coefficients of a row are set to zero, thus effectively removing the row, there may be one or more other rows below and/or above that are not removed. This has been found to reduce the phase distortion in the reconstructed picture. For instance, if we have a common 8*8 matrix and we want a 4*4 reconstruction block, we can remove (i.e. set to zero) every other row and every other column of the kernel matrix to generate a new kernel matrix in 4*4 resolution, which will eventually generate a 4*4 decoded block output.

Figure 5:
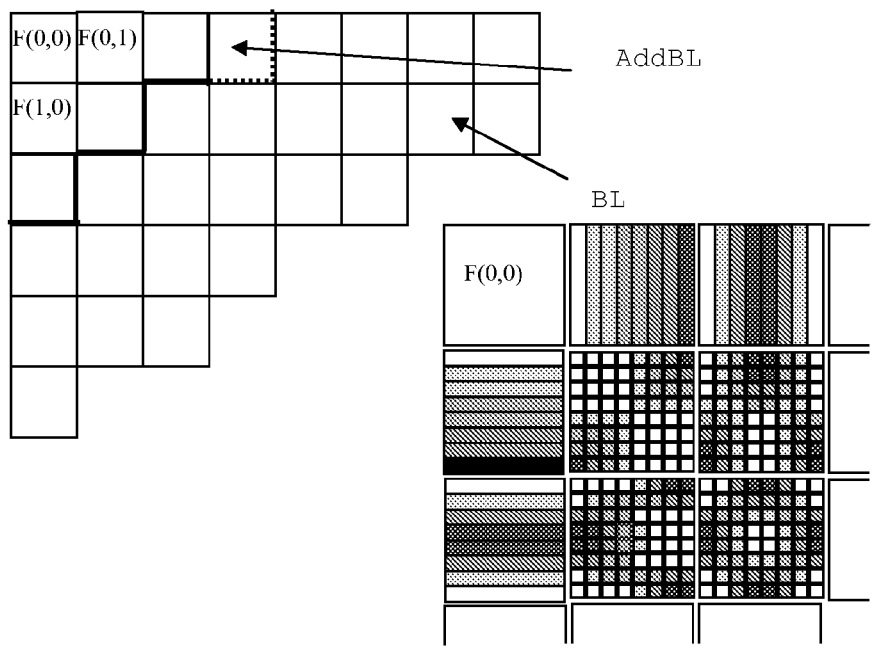
FIG. 5 the impact of a reduced kernel matrix on the frequency coefficient matrix.
Figure 5:
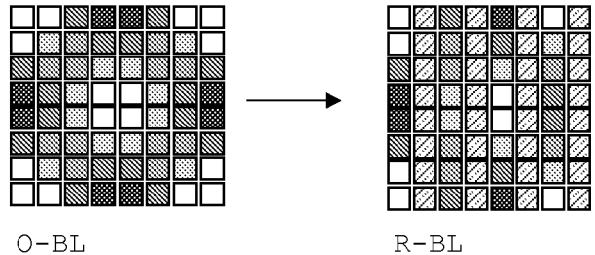

If every decoded block size is reduced proportionally to its original size, as in the above example, the size of the decoded frame is also reduced proportional to its original resolution, and the aspect ratio is maintained. However, it is possible and very easy to reduce block sizes differently for vertical and horizontal directions, which results in a modified aspect ratio. One example is shown in FIG. 5: while in the original matrix O-BL all coefficients are included, the reduced matrix R-BL has four single columns set to zero, and thus effectively deleted. This can be done for some or all coefficient sub-matrices $F(u,v)=F(0,0), F(0,1), F(1,0), \ldots$. In any case, less memory is required during the processing and less processing operations are required to obtain the decoded frame. By applying the scheme and taking advantage of SIMD (Single-Instruction, Multiple-Data) instruction architecture, the inverse DCT can be performed very efficiently.

Motion Vector Truncation

In the following, the aspect of motion vector processing is further explained. Motion vectors are used in motion compensation to indicate motion disparity between different frames. In most video coding standards, sub-pixel based motion compensation are applied. For instance, for MPEG-2, a bilinear filter is applied to interpolate the sub-pixel values; for MPEG-4/Part10 (or AVC), a 6-tap Wiener filter is applied to interpolate half pixel values, and a bilinear filter is applied to interpolate quarter pixel values. Therefore the computational cost of interpolation is high. For a video browsing system, perfect reconstruction of video frames is not required. Sub-pixel motion vectors can be approximated using integer pixel motion vectors. For fast browsing system, we can pre-process all the motion vectors into integer pixel motion vectors using:

$$MV_{new} = \text{TruncInt}(MV_{org} + 0.5) \quad (5)$$

In this way, the complexity of motion compensation is significantly reduced.

In one embodiment, the aspect ratio of the blocks is modified due to skipping the decoding of coefficients, as described above. In this case, the motion vectors may be scaled correspondingly before the truncation. E.g. if the blocks of a w*h picture are scaled by 1:8, the motion vectors are scaled as $$MV_x = MV_{old,x} * w/8 \quad (5a)$$

$$MV_y = MV_{old,y} * h/8 \quad (5b)$$

In one embodiment, the invention comprises converting the sub-pixel motion vectors into integer motion vectors by the above-mentioned truncation. Further, we can use the filter applied in the corresponding CODEC to generate sub-pixel interpolation results, e.g. bilinear filters in MPEG-2 and 4-tap/6-tap filter in MPEG-4/Part 10.

Deblocking Filter

One aspect of the invention concerns the deblocking filter. Normally a deblocking filter affects several pixels around the block edge. E.g. MPEG-4/Part10 has a complicated procedure for performing different filter steps according to the boundary strength of each block edge. The affected range of pixels is p3 p2 p1 p0 q0 q1 q2 q3 with the px being pixels of a particular block and the qx being pixels of its neighbour block. A deblocking filter smoothes the px and qx so that edges dont appear disturbing to the viewer. The decision of the filter is taken by block size, block mode, and residual information. This structure is very hard to be accelerated and processed in parallel with DSPs or FPGAs. Such kind of acceleration is one of the bottlenecks of fast video browsing. According to one aspect of the invention, a simplified deblocking filter can be used as a substitute to approximate the decode results and still guarantee a good subjective quality.

In one embodiment, a simple low pass filter is applied, e.g. a filter with coefficients [0.5, 0.5] at p0 and q0 produces a satisfying deblocking result.

Adaptive Frame Dropping

Another aspect of the invention is adaptive partial frame dropping. The present invention proposes applying a smart frame-skip strategy to pull down the frame rate from a high level to low level. Therefore the original video can be decoded with lower computational complexity. The target of this decoding process is to browse the content of one or multiple channels of high frame-rate video, or transcode the result video(s) for archive with a different frame rate setting. To pull down the frame-rate of the original video, the following procedure may be used. First, an output frame rate controller is provided that guides the engine in deciding whether a current picture is to be abandoned or not. Before decoding the frames, the adjacent sequence structure is analyzed or probed to decide whether the current picture can be abandoned. By combining the results of these two factors, an adaptive frame-rate pull down framework is obtained.

Image capture devices have different video output formats. E.g. in professional level video broadcasting and editing, 60 fps or 59.97 fps are commonly applied, while on consumer level applications 30 fps or 29.97 fps are often used. During video browsing, the viewer only wants to know what the video content is about. 30 fps is good enough to tell the story instead of 60 fps. Thus, fully decoding the 60 fps video is unnecessary, and sometimes unachievable due to high computational costs. Therefore pulling down the frame rate of the input video before decoding can save a lot of computation costs. Thereby, it is easier to browse multiple channels of high frame-rate video simultaneously.

One aspect of the invention is a fast high frame-rate video browsing method. In the proposed method, a smart frame skip scheme is designed to pull down the frame-rate of an original video sequence to a pre-selected frame-rate. By detecting the frame coding type of the next frame, the decoder can smartly decide whether to decode current frame or to skip it.

In one embodiment, three variables are used to mark the status of the video decoder during initialization:

A $1^{st}$ variable frm_alrdy_decoded indicates how many frames have already been decoded since decoding starts.

A $2^{nd}$ variable frm_alrdy_skipped indicates how many frames have already been skipped since decoding starts. It is initiated to 0.

A $3^{rd}$ variable frm_decoding_prop indicates the proportion or percentage of the video frames that have been decoded, relative to all the frames sent to the decoder. It is initiated to 0%.

When the processing of all frames is finished, frm_alrdy_decoded is incremented by 1 if the frame is decoded; otherwise, if decoding of the frame is skipped, frm_alrdy_skipped is incremented by 1.

Then the frm_decoding_prop is updated to be frm_alrdy_decoded/(frm_alrdy_decoded+frm_alrdy_skipped).

By maintaining these three variables, the percentage of frames that have been fully decoded can be supervised. Thus, it can be determined how many frames were sent to the display or to the transcoder, and the further decoding process can be controlled correspondingly.

The following is a simple example to illustrate how this factor can help with frame rate pull-down. If the input video is 60 fps, but the video can be viewed or transcoded to 30 fps, it is clear that exactly half the number of the video frames should be sent to the display or transcoder, while the other half of the frames is abandoned. Thus, the frm_decoding_prop should be 50% in this example. Described below is the process of determining which frames to drop.

In one embodiment, a Skippable Frame Marking Module is used. In most video coding standards, there are typically three kinds of frames: I-frames (intra-coded), P-frames (predicted) and B-frames (bi-directionally predicted). Prediction requires reference frames. Reference frames are frames that are referenced by at least one other frame for prediction, and non-reference frames are frames that are not referenced by at least one other frame for prediction. I-frames can be decoded independent of other frames. P-frames can be decoded by prediction referring to a forward reference frame, and B-frames can be decoded by prediction referring to two frames, namely a forward and a backward reference frame. In earlier standards, such as MPEG-1 and MPEG-2, only I- and P-frames can be used as reference frames. In later standards such as MPEG-4 Part 10 or AVC, also B-frames can be used as reference frames. In this case there is a sign indicating whether or not a frame will be used as a reference frame.

In one embodiment, the sign is evaluated while parsing the frames, and the frames are categorized into one of the categories "reference frames" or "non-reference frames".

If, for pulling down the frame rate, just every other frame is skipped during the decoding, in most cases some of the reference frames will be lost, which will cause significant prediction error and error propagation. Therefore the resulting video would be seriously degraded in subjective quality. So in one embodiment we first choose the non-reference frames as candidates to be skipped. But in some cases not all non-reference frames need to be skipped, since this would result in a sequence with too low frame rate. Therefore an adaptive method is used that decides after each decision to skip or decode a frame the new current frame rate, and takes further decisions based on the new rate.

In one embodiment, this method may use a technique called "Neighbourhood Sequence Structure Probing", as described below. In the bit-stream it is marked whether the current frame is used as a reference frame or not. E.g. for MPEG-4 Part 10/AVC this is marked in the value of nal_ref_idc in the NAL unit syntax, while e.g. in MPEG-2 only I- and P-frames are used as reference frames, but not B-frames. Also the picture start codes are defined in every standard to indicate at bit-stream level where a coded picture starts. So it is possible to locate the position of the next coming frames.

In other words, we can find out how many bits a frame occupies, depending on the employed encoding standard. Therefore in one embodiment the following further variables are used:

avg_Pframe_size indicates the average P-frame size in the current sequence up to the current frame.

theta indicates a customized factor to measure whether the current P-frame size is small enough (i.e. below a given threshold).

avg_Pframe_size is updated if the current frame is a P-frame and the number of bits for the current frame is lower (by a customized threshold factor) than the current value of avg_Pframe_size. If so, then avg_Pframe_size is updated by subdividing the total bits of decoded P frames by the total number of decoded P-frames.

One input of the "Skippable Frame Marking" module is the maximum reference frames N parsed from the sequence header or inferred from the standard; the other input is the pull down ratio r between output video and input video. We note the current frame $F_0$ and the frame after this to be $F_1, F_2, \ldots$ First the number of bits each frame occupies and the picture coding type of each picture are detected. Then the Skippable Frame Marking process described below is performed. After a frame is marked as skippable, it can be abandoned directly before the decoding process, which pulls down the frame rate. If it is not marked as skippable, it will be decoded. The detail process of how to utilize the skippable markers is explained in the following.

Figure 6:
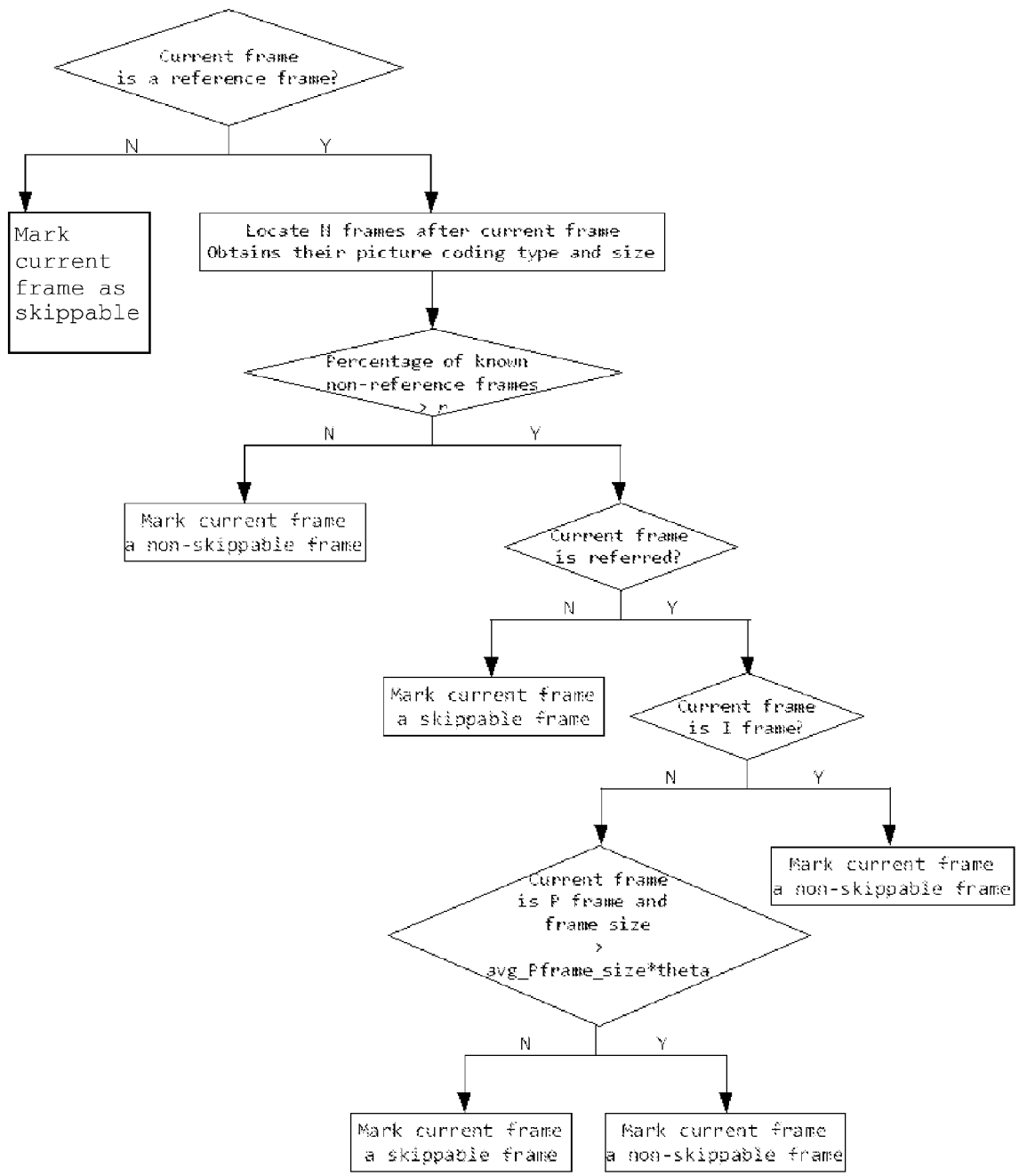
FIG. 6 a workflow of marking a skippable frame.

A framework of a "Frame Rate Pull-Down Architecture" is exemplarily shown in FIG. 6. Starting with a current frame, if the current frame is not a reference frame, it is marked as skippable. Otherwise, a certain number N of following frames are located in the bit-stream, and their picture coding types (i.e. whether or not they serve as reference frames) and sizes are determined. If the percentage of known non-reference frames is below a given factor r, the current non-reference frame is marked as non-skippable. Otherwise, it is probed if the current frame is referred by one or more other frames. If this is not the case, the current frame is marked as skippable. Otherwise, the current frame is marked as non-skippable if it is an I-frame. If it is a P-frame, the next step depends whether its frame_size is higher than avg_Pframesize*theta. If so, the current frame is marked as non-skippable, otherwise as skippable.

Figure 7:
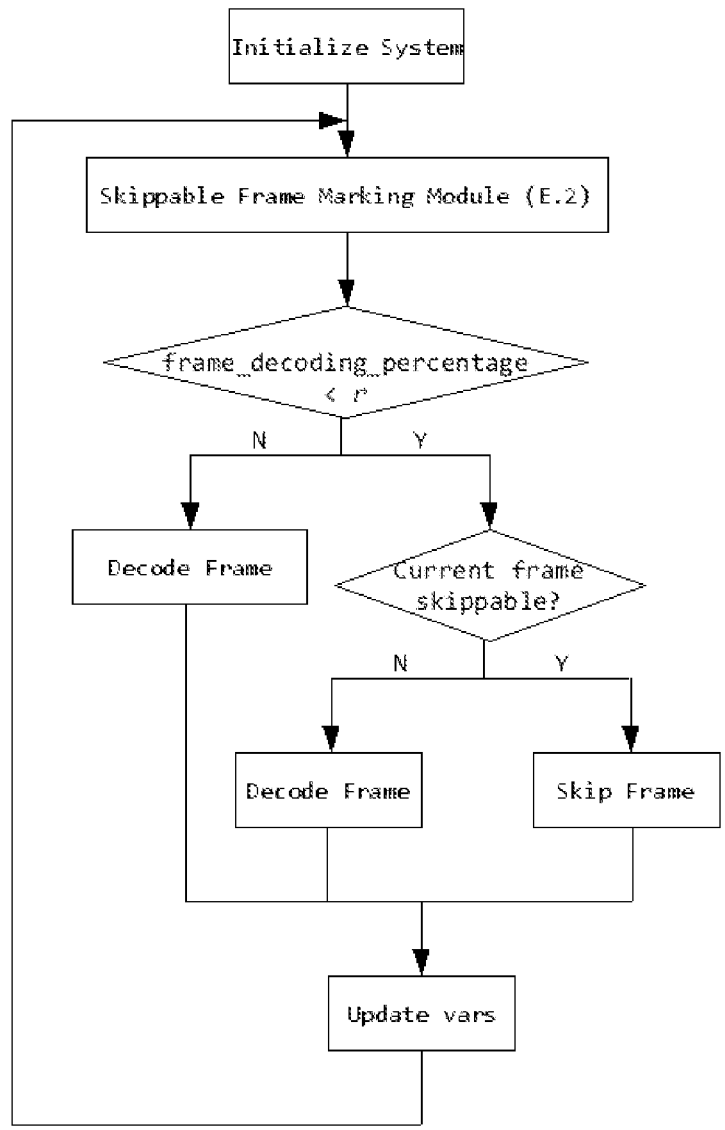
FIG. 7 a framework of frame rate pull-down.

By combining the techniques introduced above, we can pull down the frame rate of an input video during the decoding process, in order to reduce computation workload. The framework is shown in FIG. 7. By applying the framework, the complexity of high frame-rate pulling down video decoding can be significantly reduced. Multiple channels of high frame-rate video can be pulled down in real-time during sequence parsing time instead of after decoding. In case of a GPU or DSP (Digital Signal Processor) based decoding environment, more and more channels of high frame-rate video feeds can be pulled down in the same time.

Processing of Interlaced Video

Compared to progressive video decoding, the decoding and display of an interlaced video signal is more complicated. This is mainly due to the different decoding behaviour in inverse transform and motion compensation for top and bottom fields. De-interlacing is needed to produce a full quality result. But in the case of fast browsing of an interlaced video, it is not necessary to view the video in full resolution and quality of the source. In practice, for fast scanning it is sufficient to get the idea of what the video content is about using a lower resolution. Therefore a fast browsing scheme for interlaced video can be designed according to the structure of the bit-stream.

In one embodiment of the invention, we target to generate an output video in half the height and width of the original. Therefore significant computational decoding cost can be saved.

We note the inverse transform block size as W*H in the following, and we apply the inverse transform phase rescaling algorithm explained above as a tool to achieve fast browsing for interlaced video bit-streams.

In the case of fast browsing Intra Only Interlaced video bit-streams, each frame can be decoded independently. Therefore, in one embodiment we achieve fast browsing by only decoding half the horizontal resolution of the top fields or bottom fields while skipping all other data.

For field pictures, the top field picture and bottom field pictures are decoded in separate bit-stream syntax. Therefore, in one embodiment we select to keep all the top fields and drop all the bottom fields, or vice versa.

Figure 8:
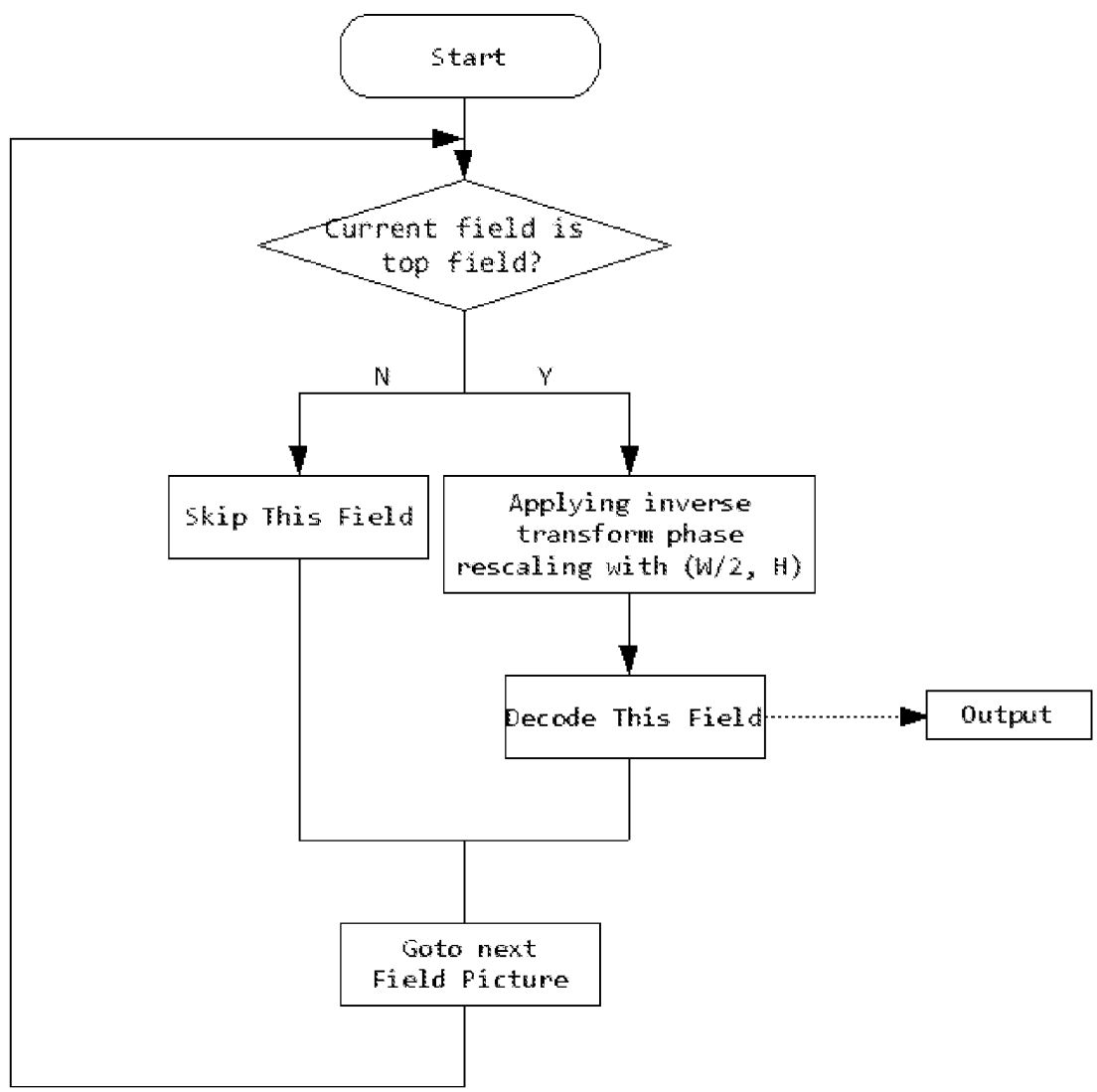
FIG. 8 fast browsing of an intra-only field picture structure in interlaced video streams.

Then for all the kept field pictures, we apply the inverse transform phase rescaling algorithm with customized input of decoded block size (W/2, H) to generate a video with correct display aspect ratio. Since the result video has only one field, de-interlacing the video can be skipped and still the subjective quality is good for browsing. Details of the workflow are shown in FIG. 8. The fields are parsed one by one, only one type of fields (e.g. bottom fields) is selected while the other type is dropped, and then inverse transform phase rescaling with (W/2,H) is performed on the selected fields before decoding them.

Figure 9:
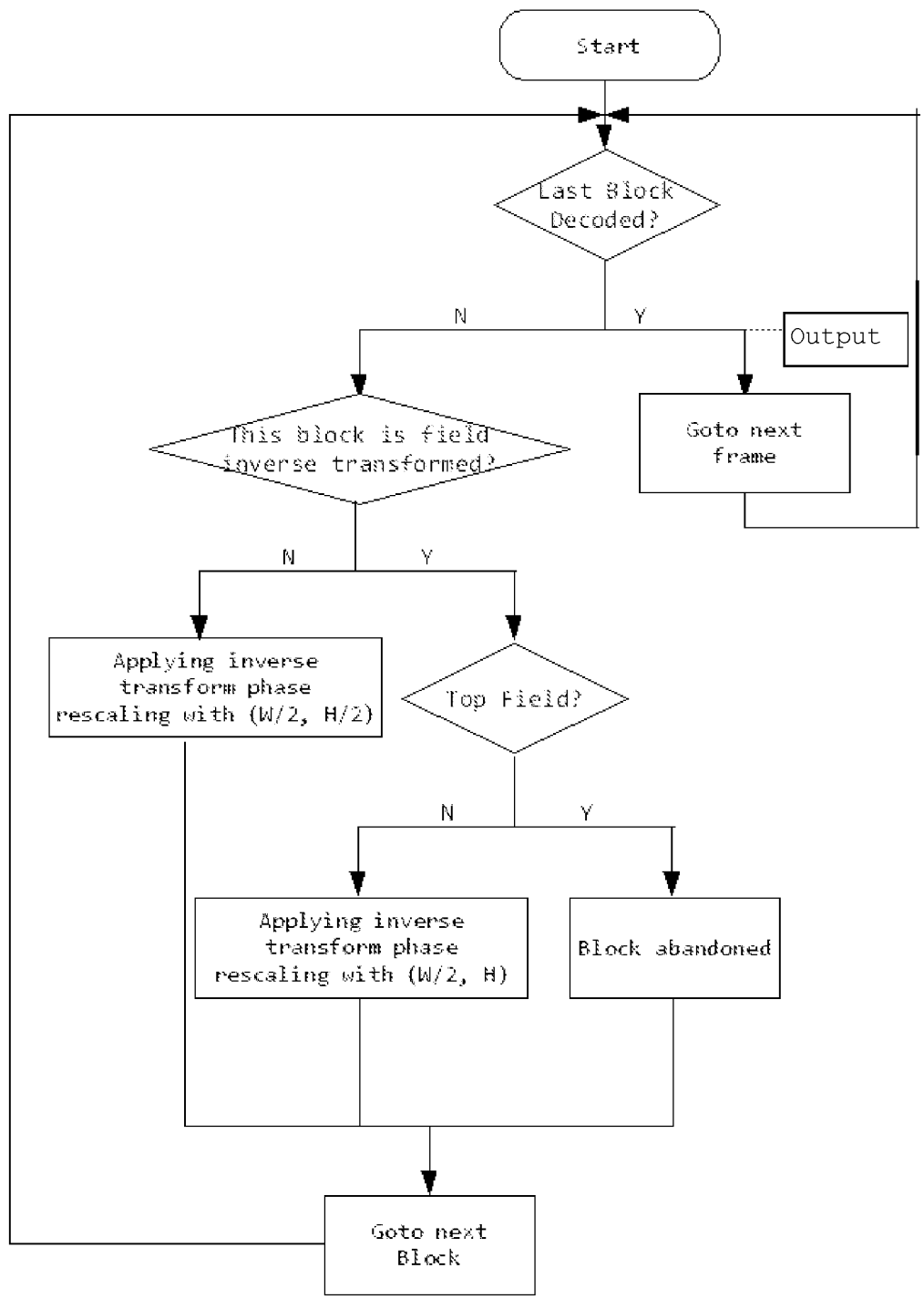
FIG. 9 fast browsing of an intra-only frame picture structure in interlaced video streams.

For frame pictures, two different inverse transform modes are possible. One is field inverse transform, producing a residual block for a field. The other one is frame inverse transform, producing a residual combined block of two fields. For field inverse transform blocks, the bottom field coefficients are directly abandoned to only keep top fields decoded. We apply inverse transform phase rescaling with customized input of decoded output block size of (W/2, H). For frame inverse transform blocks, we apply the inverse transform phase rescaling with customized input of decoded output block size of (W/2, H/2) to generate a video with only top field in the correct aspect ratio. Since the result video has only one field, we can skip de-interlacing the video, and the subjective quality can be very good. The detail workflow is shown in FIG. 9.

A different case is the browsing of "long GOPs". A long GOP is understood as a group-of-pictures comprising I-frames, P-frames and B-frames. In the case of fast browsing long GOP Interlaced video bit-streams, not each frame in the bit-stream can be decoded independently. Therefore, in order to browse the interlaced video sequence efficiently, we decode both fields with half the width. Then we can drop all bottom fields or top fields to get a correct aspect ratio of the decoded video. In this way the computational cost can be reduced substantially by 50%.

Figure 10:
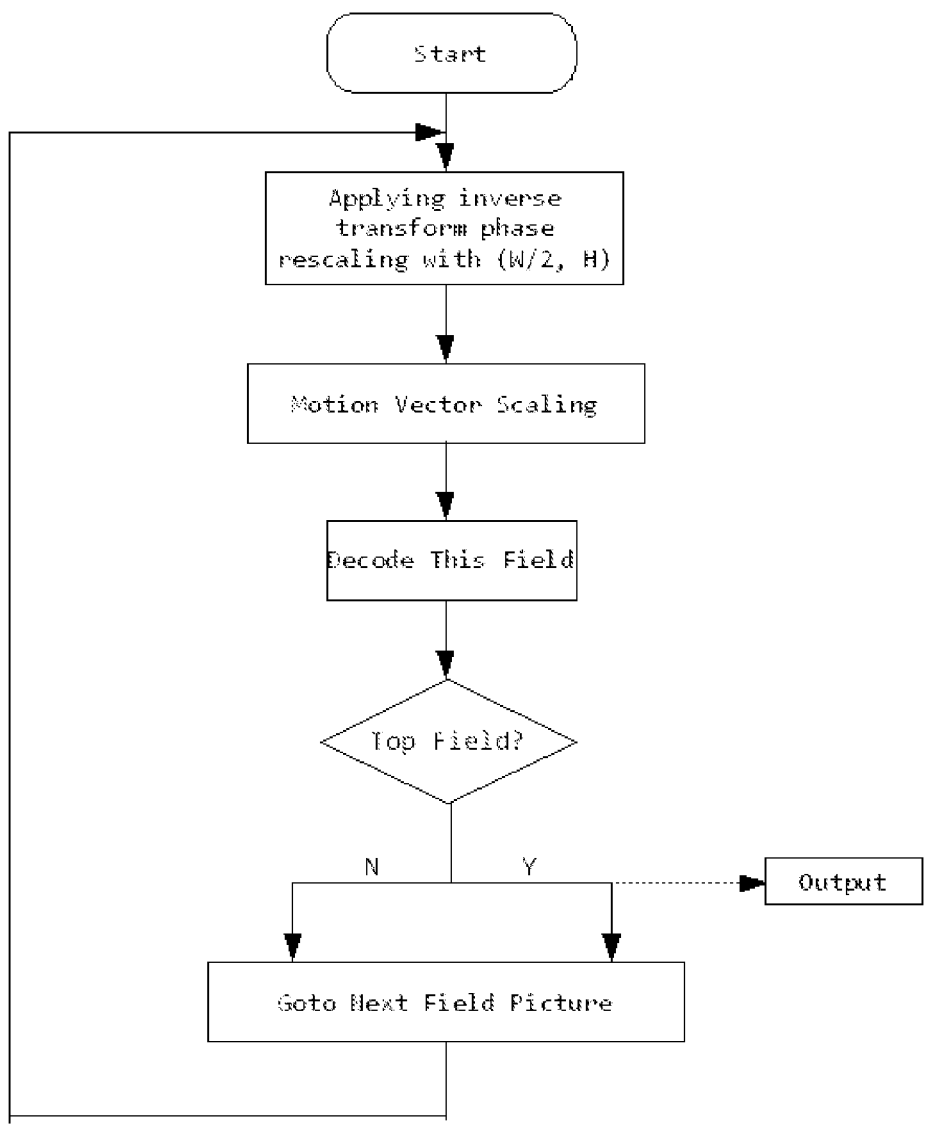
FIG. 10 fast browsing of a long GOP field picture structure in interlaced video streams.
Figure 11:
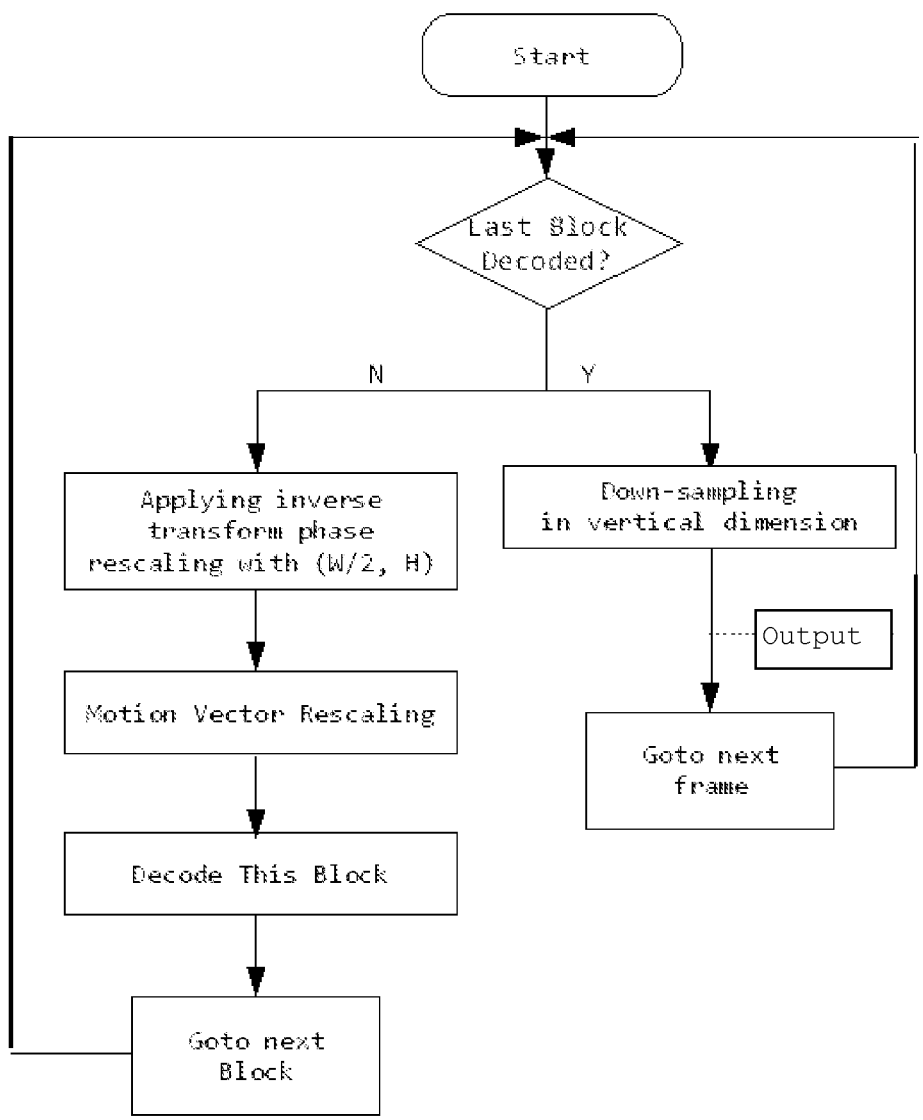
FIG. 11 fast browsing of a long GOP frame picture structure in interlaced video streams.

In the case of Field Pictures, we apply for all blocks the inverse transform phase rescaling with customized input of decoded output block size (W/2, H). Since the reference frame/field are half in horizontal width, the motion vectors are scaled as described by equations (5a) and (5b). Then we output the top field picture as the decoded result of the current frame. Since the result video has only one field, de-interlacing the video can be skipped and the subjective quality can be very good. The detail workflow is shown in FIG. 10.

One aspect of the invention is adaptive partial coefficient decoding, as described above. It can be used to speed up the whole decoding process. The coefficients parsed from the bit-stream are processed with inverse quantization IQ and inverse transform IT sequentially, as shown in FIG. 1. In high data rate video sequences, a lot of coefficients exist in the bit-stream. Therefore there are a lot of computations performed in these two modules IQ,IT.

Various application scenarios are possible, e.g. HD video browsing on memory limited systems, power limited systems or for small displays. The proposed framework requires significantly less memory to decode the bit-stream compared to original framework. E.g. if we only output half the original size of decoded block size, only 25% memory is required compared to the original framework. Thus the proposed framework is very suitable for memory limited systems. Further, the proposed framework avoids performing inverse transform and motion compensation to a lot of pixels in a frame. Thus the decoding complexity is very low comparably. So the power consumed for HD video decoding can be significantly reduced. Finally, for systems with small display like mobile phones and hand-held devices, the proposed framework can directly decode a small resolution video instead of a high definition frame, which will be down-scaled eventually after reconstruction.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

The invention claimed is:

1. A method for browsing a plurality of video sequences, each of the plurality of video sequences comprising frames that are blockwise encoded, each block comprising an M*M frequency domain coefficient matrix, wherein the coefficients represent vertical and horizontal frequency components, the method comprising
    determining a target level of spatial reduction and temporal reduction;
    determining a current spatial reduction level and a current temporal reduction level for browsing said plurality of video sequences;
    determining, according to the determined current spatial reduction level and temporal reduction level frames, fields or parts of blocks or macroblocks to be skipped for decoding;
    determining whether or not the target level is reached if said fields or parts of blocks or macroblocks are skipped for decoding, and if the target level is not reached, iteratively determining reduced current spatial and temporal reduction levels until the target level is reached;
    decoding simultaneously the remaining data to the plurality of video sequences with lower spatial resolution and lower temporal resolution; and
    providing the decoded data for a display,
    wherein the step of decoding comprises, for each video sequence,
    determining for each frequency coefficient $F_{(u,v)}$ a matrix representing a contribution of the frequency coefficient to the time domain pixels of the current block;
    setting in the matrix the coefficients of at least one column or one row to zero, wherein neighbor columns on both sides of said column or neighbor rows above and below said row are not set to zero;
    performing inverse quantization and inverse transform using the coefficients of said matrix, wherein time domain pixel blocks with less than M*M pixels are obtained;
    generating a video frame from the pixel blocks; and
    performing deblocking filtering on said generated video frame wherein a simple low-pass filter with coefficients [0.5, 0.5] is used.

2. Method according to claim 1, wherein two or more non-adjacent rows or columns in said matrix are ignored or set to zero and at least one row or column between said two or more columns or rows is not ignored and not set to zero.

3. Method according to claim 1, wherein the time domain pixel blocks are not quadratic, and wherein spatial scaling with different scales in vertical and horizontal direction is obtained.

4. Method according to claim 1, wherein at least one of the video sequences is interlaced, and wherein only the top field or only the bottom field of an interlaced picture is used, and wherein half the columns of said matrix are set to zero, whereby a horizontal scaling of 50% is obtained.

5. Method according to claim 1, wherein temporally adjacent frames within said sequence form a GOP, and wherein frames within the GOP are predicted based on other frames within the GOP, further comprising steps of
determining a target frame rate;
determining in the GOP one or more reference frames and one or more non-reference frames;
determining a first, current frame rate based on the reference frames;
comparing the first, current frame rate with the target frame rate;
if the determined first frame rate matches the target frame rate, decoding only the reference frames;
if the determined first frame rate is lower than the target frame rate, decoding the reference frames and at least one of the non-reference frames;
if the determined first frame rate is higher than the target frame rate, determining among the one or more reference frames at least one first reference frame that is referenced only by frames that are not reference frames, and decoding only reference frames other than said first reference frame.

6. Method according to claim 5, further comprising in the case of the determined first frame rate being lower than the target frame rate the steps of
determining within the GOP the longest temporal distance between reference frames; and
selecting for said decoding a non-reference frame that is substantially in the temporal center between its adjacent reference frames.

7. Method according to claim 5, further comprising steps of
marking the non-reference frames as skippable;
in the case of the determined first current frame rate being lower than the target frame rate, determining a first non-reference frame that is to be decoded and marking the first non-reference frame as not skippable;
upon said determining and/or marking the first non-reference frame, re-calculating a new current frame rate;
comparing the current frame rate with the target frame rate; and
based upon the result of the step of comparing the current frame rate with the target frame rate, either decoding the frames that are not marked as skippable or repeating the steps of determining a non-reference frame, re-calculating a new current frame rate and comparing the current frame rate with the target frame rate.

8. Method according to claim 1, wherein generating a video frame from the pixel blocks comprises performing motion compensation at least for non-reference frames, further comprising
decoding motion vectors;
truncating the motion vectors to integer values; and
performing the motion compensation based upon the truncated motion vectors.

9. Apparatus adapted for performing a method according to claim 1.

10. An apparatus for browsing a plurality of video sequences, each of the plurality of video sequences comprising frames that are blockwise encoded, each block comprising an M*M frequency domain coefficient matrix, wherein the coefficients represent vertical and horizontal frequency components, the apparatus comprising a processor, a graphics processing unit (GPU) and a memory, the memory having stored thereon instructions that when executed on the processor or the graphics processing unit cause the apparatus to
determine a target level of spatial reduction and temporal reduction;
determine a current spatial reduction level and a current temporal reduction level for browsing said plurality of video sequences;
determine, according to the determined current spatial and temporal reduction levels frames, fields or parts of blocks or macroblocks to be skipped for decoding;
determine whether or not the target level is reached if said fields or parts of blocks or macroblocks are skipped for decoding, and if the target level is not reached, iteratively determining reduced current spatial and temporal reduction levels until the target level is reached;
decode, on the graphics processing unit, simultaneously the remaining data to a plurality of videos with lower spatial resolution and lower temporal resolution; and
provide the decoded data for a display,
wherein the decoding comprises for each video sequence steps of
determining for each frequency coefficient $F_{(u,v)}$ a matrix representing a contribution of the frequency coefficient to the time domain pixels of the current block;
setting in the matrix the coefficients of at least one column or one row to zero, wherein neighbor columns on both sides of said column or neighbor rows above and below said row are not set to zero;
performing inverse quantization and inverse transform using the coefficients of said matrix, wherein time domain pixel blocks with less than M*M pixels are obtained; and
generating a video frame from the pixel blocks;
performing deblocking filtering on said generated video frame wherein a simple low-pass filter with coefficients [0.5, 0.5] is used.

11. The apparatus according to claim 10, wherein two or more non-adjacent rows or columns in said matrix are ignored or set to zero and at least one row or column between said two or more columns or rows is not ignored and not set to zero.

12. The apparatus according to claim 10, wherein the time domain pixel blocks are not quadratic, and wherein spatial scaling with different scales in vertical and horizontal direction is obtained.

13. The apparatus according to claim 10, wherein at least one of the video sequences is interlaced, and wherein only the top field or only the bottom field of an interlaced picture is used, and wherein half the columns of said matrix are set to zero, whereby a horizontal scaling of 50% is obtained.

14. The apparatus according to claim 10, wherein said generating a video frame from the pixel blocks comprises performing motion compensation at least for non-reference frames, further comprising steps of
decoding motion vectors;
truncating the motion vectors to integer values; and
performing the motion compensation based upon the truncated motion vectors.

* * * * *